United States Patent

[11] 3,602,342

| [72] | Inventor | Paul S. Whittle<br>620 Mountain Drive, Birmingham, Ala. 35206 |
|---|---|---|
| [21] | Appl. No. | 21,887 |
| [22] | Filed | Mar. 23, 1970 |
| [45] | Patented | Aug. 31, 1971 |

[54] SLACK ADJUSTER FOR VEHICLE BRAKES
1 Claim, 5 Drawing Figs.

[52] U.S. Cl. ................................................ 188/196 M, 74/522, 188/79.5 K
[51] Int. Cl. ................................................ F16d 65/46
[50] Field of Search ........................................ 74/522; 188/79.5 K, 196 M, 196 BA

[56] References Cited
UNITED STATES PATENTS

| 2,001,239 | 5/1935 | Buckendale | 188/79.5 K X |
| 2,015,881 | 10/1935 | Alden et al. | 188/196 M |
| 2,237,163 | 4/1941 | Rosenberg | 188/79.5 K |
| 2,484,551 | 10/1949 | Brouse | 74/522 |

*Primary Examiner*—Duane A. Reger
*Attorney*—Jennings, Carter & Thompson

ABSTRACT: A slack adjuster for vehicle brakes in which an arm has a housing at one end in which is rotatably carried a worm gear, the worm gear being splined to a brake shaft and in engagement with a worm for rotating the brake shaft relative to the arm for brake adjustment purposes. The improvement comprises splitting the worm gear in a quadrant opposite the quadrant in contact with the worm. The housing also is split so that when clamped together by bolts or the like it locks the worm gear to the brake shaft and also locks the worm to the worm gear, thereby eliminating any slack in the parts and also preventing the worm from rotating thus to maintain the brakes in adjustment.

PATENTED AUG 31 1971 3,602,342
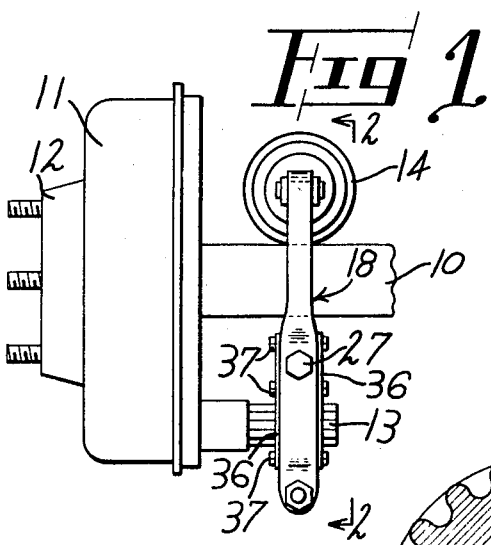
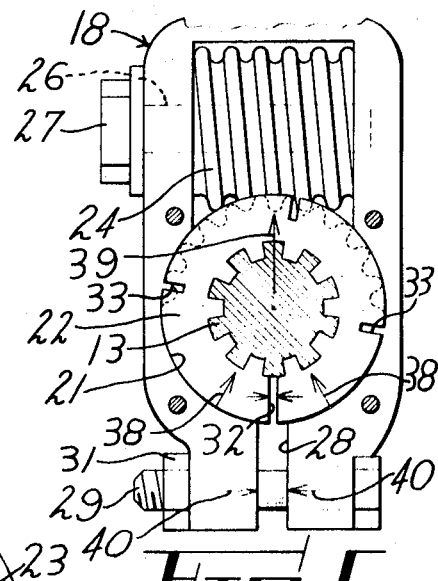
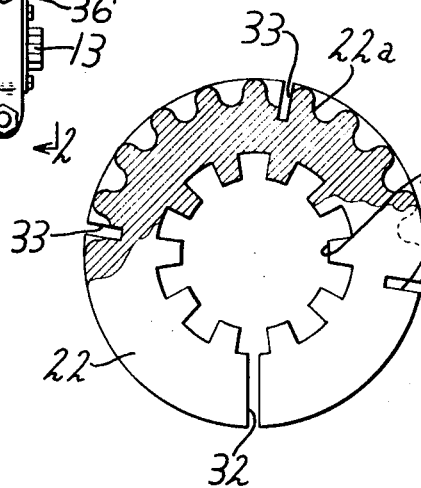
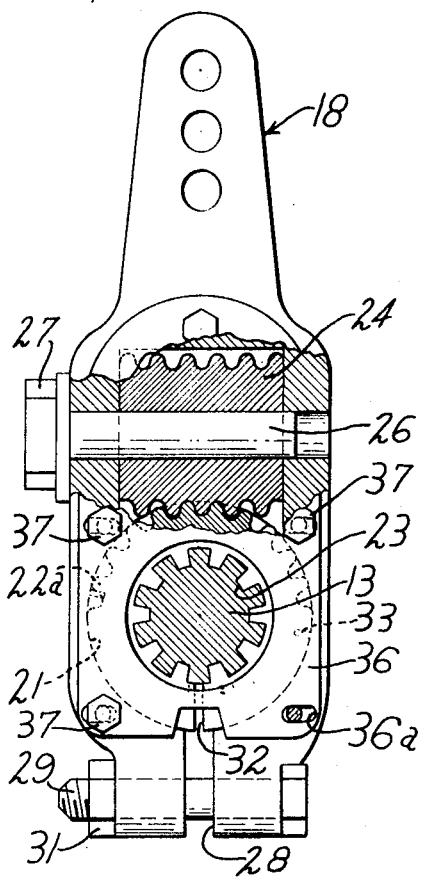
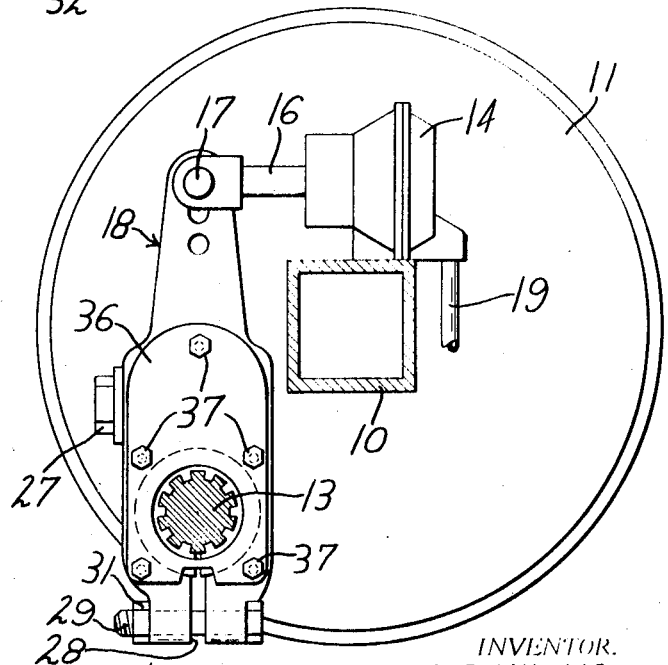
INVENTOR.
Paul S. Whittle
BY
Jennings Carter & Thompson
Attorneys

SLACK ADJUSTER FOR VEHICLE BRAKES

This invention relates to an improvement in slack adjusters for vehicle brakes, particularly heavy duty brakes such as are used on highway trailers and the like and has for an object the provision of means automatically effective to lock the parts together to eliminate slack and to maintain them in adjusted relationship.

In this art it is old to provide as part of a brake system a slack adjuster arm having a housing in one end rotatably to receive a worm gear which is splined at its center to the brake actuating shaft. It is customary to provide a worm in mesh with the gear and means to rotate the worm and hence the gear, thereby to rotate the shaft relative to the arm for brake adjustment purposes. Further, the housing has been split adjacent the worm gear so that when the halves are drawn together the worm gear is locked to the housing and in theory to the splined shaft.

The difficulty with prior slack adjusters is that even though in the prior devices the worm gear is clamped when the housing is drawn up, in the past this has not in turn locked the worm and worm gear together, thereby resulting in slack at that point, thus affording misadjustment of the brakes and wear of the parts.

My invention comprises splitting the worm gear in a quadrant substantially opposite that which is engaged by the worm. Also, this split in the worm gear is maintained generally in the quadrants of the gear adjacent the split housing in which the gear rotates. Therefore, and as will be explained, when the clamping means for the split housing is drawn up, the split in the worm gear permits it to compress tightly about the splined brake operating shaft and also forces the engaging quadrant of the worm gear tightly into engagement with the worm, thereby simultaneously locking those two parts together and eliminating slack at both points of connection.

In view of the foregoing the general object of my invention is to provide an improved slack adjuster for vehicle brakes in which the clamping of the housing clamps the worm gear to the splined brake shaft and likewise tightly clamps the worm gear to the worm, eliminating slack at all points.

Apparatus illustrating features of my invention is shown in the accompanying drawings forming a part of this application in which:

FIG. 1 is a somewhat diagrammatic elevational view showing my improved slack adjusting mechanism applied to a brake shaft associated with a brake drum;

FIG. 2 is a view taken generally along line 2—2 of FIG. 1 with certain parts broken away;

FIG. 3 is an enlarged view of the arm and shaft also taken along line 2—2, certain parts being broken away and in section;

FIG. 4 is a detached view of the worm gear with certain portions of the same broken away and in section; and, FIG. 5 is a fragmental view generally similar to FIG. 3 showing the lower end of my improved assembly, for the purpose of illustrating the forces involved which bring about the locking of the parts.

Referring now to the drawings for a better understanding of my invention, at 10 I illustrate the axle of a vehicle which may be a trailer axle. The usual brake drum 11 is mounted on the axle and there may be a hub 12 with studs to receive a pneumatic tired wheel as is customary.

Projecting inwardly from the rear side of the brake drum is a splined brake operating shaft 13. Mounted on the axle is a pressure actuated cylinder 14 having a piston rod 16 which is pivotally connected at 17 to the upper end of a slack adjuster arm generally indicated by the numeral 18. Air may be supplied through a line 19 to the brake cylinder 14 for actuating the brake by rotating the shaft 13 in the manner well understood.

The arm 18 at its lower end is shaped to provide a housing 21 which rotatably receives a worm gear 22. The worm gear has an internally splined bore 23 which fits about complementary splines on the shaft 13.

Further toward its upper end the housing portion of the arm 18 rotatably receives a worm 24 fastened on a shaft 26 and which meshes with the worm gear 22. One end of the shaft 26 may be provided with a nutlike end 27 to receive a tool.

It will be noted that the lower end of the arm is split as at 28. The halves of the arm may be drawn together by means of a threaded bolt 29 and a nut 31.

The gear 22 may be provided with teeth 22a on substantially 180° of its outer periphery. Opposite the toothed portion I split the gear 22, completely through, as indicated at 32. I may provide weakening splits 33 at other locations about the periphery of the gear 22.

The parts are held assembled in the lower end of the arm by means of cover plates 36 and studs 37, the plate being provided with elongated openings 36a to permit the housing halves to close in response to tightening of the nut 31.

From what has been described it is now possible to explain the construction and further advantages of my invention. With the parts assembled as shown in the drawings, that is, with the toothed portion 22a of the gear 22 in mesh with worm 24, the split 32 is located in a quadrant of the gear 22 generally opposite the quadrants which are toothed. Further, the split 32 is located adjacent the split 28 of the housing. When it is desired to adjust the brakes, namely to take the slack out of the same by rotating the shaft 13, nut 21 is loosened, whereupon the parts are free to rotate in response to rotation of the worm 24. This therefore rotates the shaft 13 relative to the arm 18. It will be understood that the rotation in question ordinarily is but a fraction of a revolution of the gear 22 and therefore the split 32 remains generally at the bottom of the arm 18, that is, near the split 28 in the lower end of the arm 18. With the adjustment made, the nut 31 is run up, drawing the two halves of the housing toward each other as indicated by the arrows 40, FIG. 5. This tends to pull the halves of the gear toward each other, that is tending to close the split or crack 32. This results in forces on the gear indicated by the arrows 38. It will thus be seen that the gear is now tightly locked about the splines of the shaft 13. In addition, the resultant of the forces indicated by the arrows 38 is indicated by the arrow 39, namely, the gear 22 tends to become somewhat elliptical, that is, getting longer in a vertical axis as viewed in FIG. 5. This forces the teeth 22a of the gear tightly into contact with the worm 24, thus locking the worm and gear together Therefore, by the arrangement illustrated I securely lock the worm gear 22 to the splined shaft and by the same mechanism securely lock the worm and gear.

It will also be apparent that when the worm has been rotated to the point that all of the teeth 22a are used up or moved to one side, then the parts can be brought back to the position shown in the drawing simply by loosening the nut 31, moving the arm off the end of the shaft 13 and resetting the split or slot 32 generally in line with the slot of split 28 in the housing by rotating the worm 24.

From the foregoing it will be apparent that I have devised an improved slack adjuster for vehicle brakes. My invention has proven to be satisfactory and not only eliminates the slack heretofore resulting from wear of the splines of the gear and shaft 13, but also eliminates the slack at the point of engagement between the worm and gear.

While I have shown my invention in but one form, it will be obvious to those skilled in the art that it is not so limited, but is susceptible of various other changes and modifications without departing from the spirit thereof.

What I claim is:

1. In a slack adjuster for vehicle brakes,
   a. a brake arm having adjacent one end a worm gear housing,
   b. a worm gear rotatably mounted in the housing having a centrally disposed splined opening therein adapted to fit about a complementarily splined brake shaft,
   c. a worm carried by the brake arm and in mesh with the worm gear for rotating the gear relative to the housing, thereby to adjust the angular position of the arm relative to the brake shaft, d. said worm gear being split from its outer periphery to its center, said split being located in a quadrant of the worm gear generally opposite the quadrant thereof in engagement with the worm,
e. said housing being split at a position generally opposite the quadrant of the gear which engages the worm, and
f. means on the split housing for clamping it tightly about the periphery of the worm gear in turn to clamp the worm gear about the splined portion of the brake shaft and to force the worm engaging quadrant of the worm gear into tight, locking engagement with the worm, thereby to eliminate slack between the worm and gear while also locking the gear to the splined shaft.